Inventor
Harry K. Blanning
by Parker & Carter
Attorneys

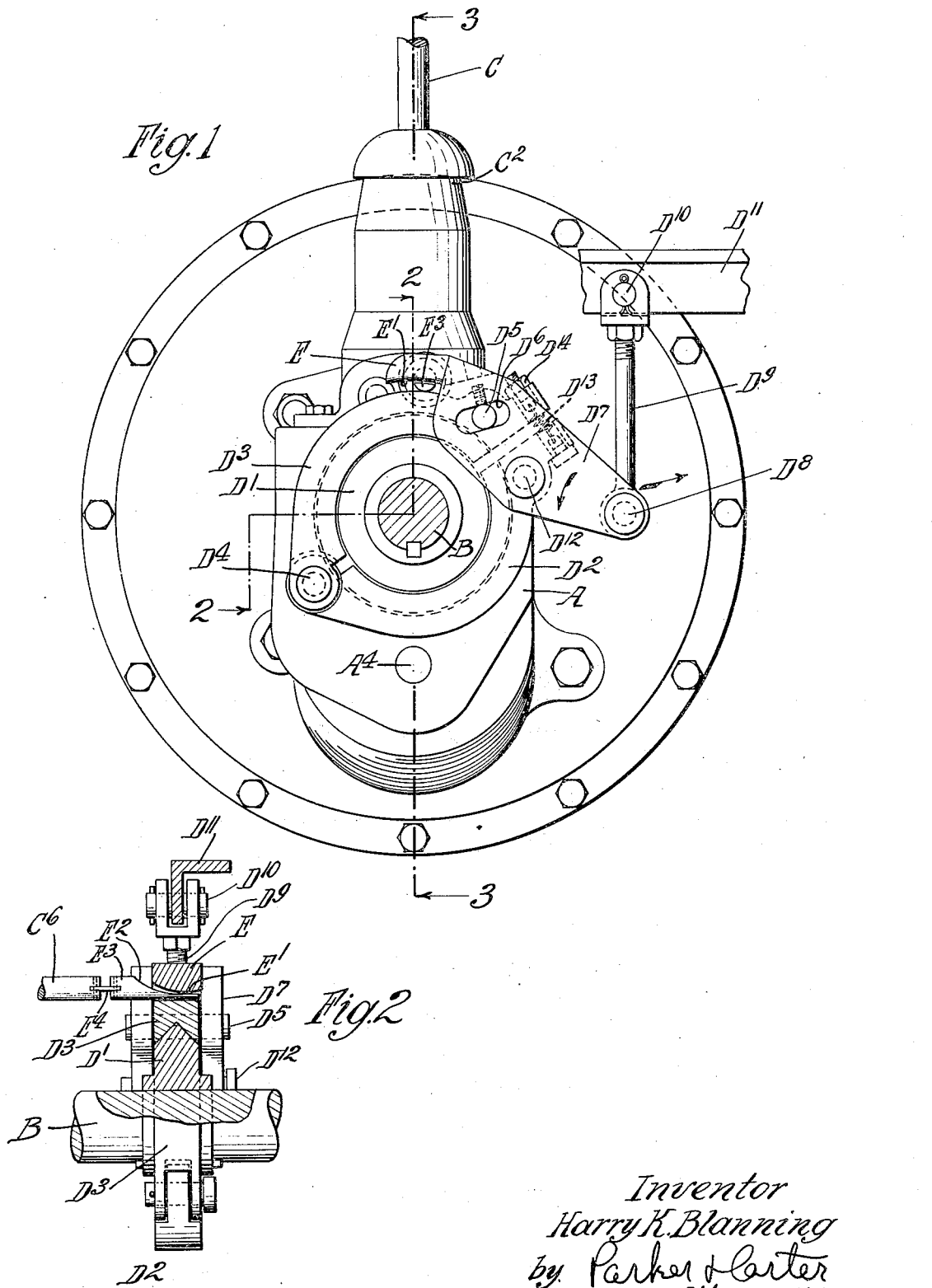

Aug. 11, 1931.    H. K. BLANNING    1,818,938
SAFETY DEVICE FOR MOTOR VEHICLES
Filed Oct. 21, 1929    3 Sheets-Sheet 3
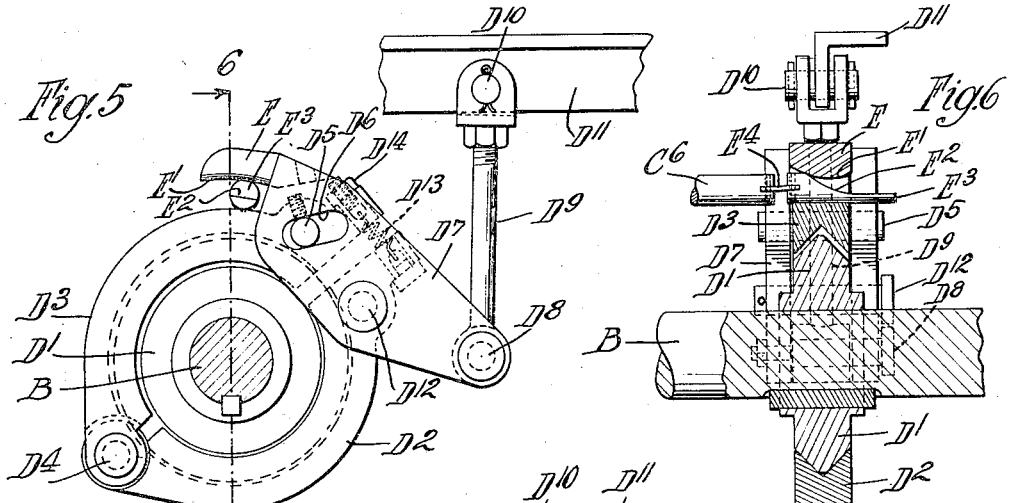
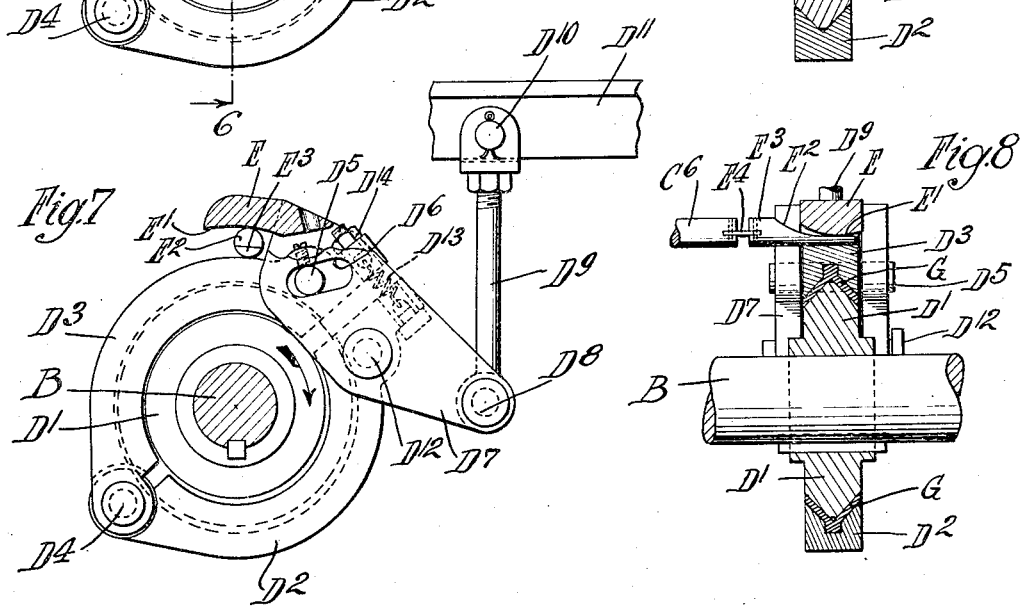
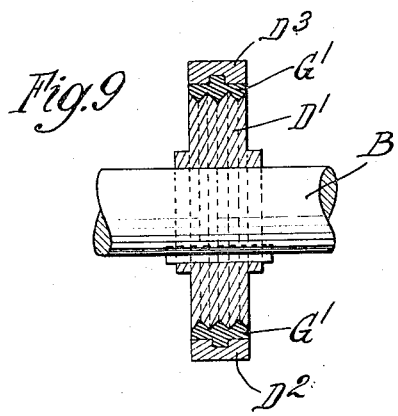
Inventor
Harry K. Blanning
by Parker & Carter
Attorneys.

Patented Aug. 11, 1931                                                         1,818,938

UNITED STATES PATENT OFFICE

HARRY K. BLANNING, OF CHICAGO, ILLINOIS, ASSIGNOR OF FORTY-NINE ONE-HUN-
DREDTHS TO LILLIE K. BLANNING, OF NEW CASTLE, PENNSYLVANIA

SAFETY DEVICE FOR MOTOR VEHICLES

Application filed October 21, 1929. Serial No. 401,294.

My invention relates to a safety device for motor vehicles and particularly to a device for preventing unintended retrograde movement of the vehicle. One object is the provision of means for preventing rearward movement of the car except when the gear shift is in reverse. Another object is to provision of means for preventing retrograde movement of the car when the car stalls or when the clutch is in neutral. Another object is the provision of means for rendering the locking means inoperative when the gear shift is in reverse. Another object is the provision of improved locking members for association with the said locking means. Other objects will appear from time to time in the course of the specification and claims.

I illustrate my invention more or less diagrammatically in the accompanying drawings, wherein—

Figure 1 is an end elevation. along the axis of the drive;

Figure 2 is a section on the line 2—2 of Figure 1;

Figure 5 is a section similar to Figure 1, parts being omitted, with the parts shown in different position;

Figure 6 is a section on the line 6—6 of Figure 5;

Figure 7 is a section similar to Figure 5 with the parts in still a different position;

Figure 8 is a section similar to Figure 6 with the parts in different position;

Figure 9 illustrates a variant form of locking member, which may be optionally employed with the structure of the earlier figures.

Like parts are indicated by like symbols throughout the specification and drawings.

Figure 3:
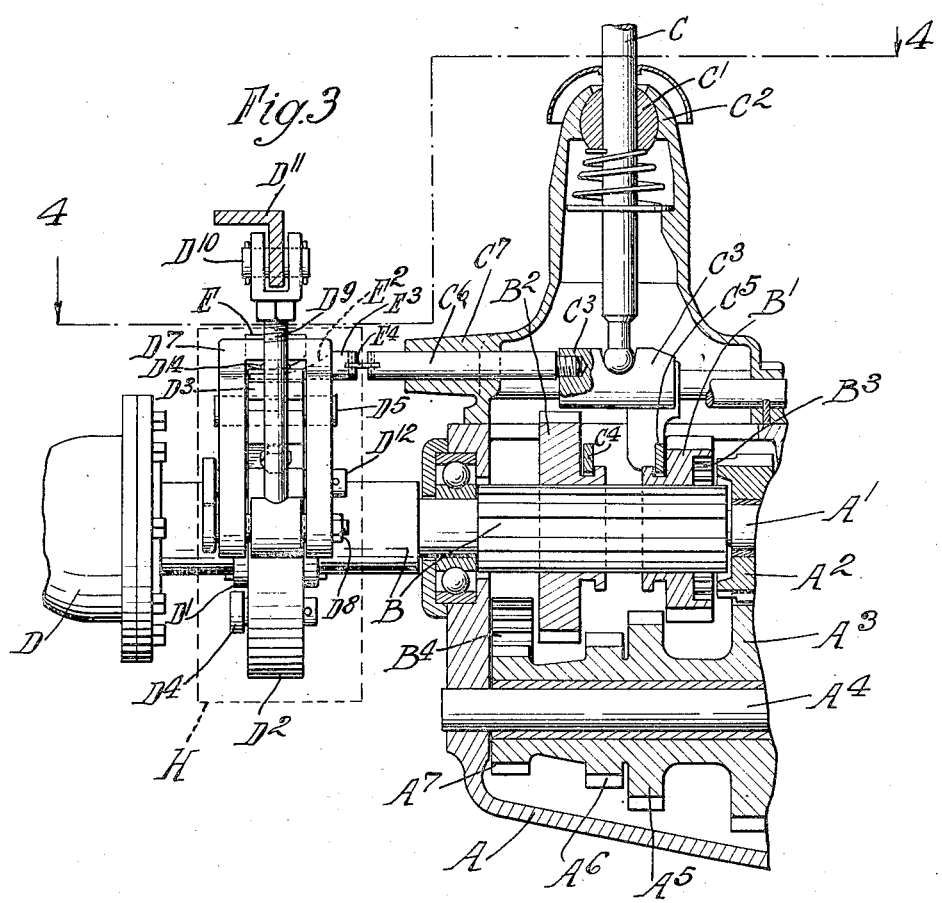
Figure 3 is a section on the line 3—3 of Figure 1.

Referring to the drawings A generally indicates the gear shift or transmission housing. $A^1$ indicates the drive shaft, which may be driven from the engine, not shown. $A^2$ indicates a gear on the drive shaft in constant mesh with the gear $A^3$ on the counter shaft $A^4$. Associated with the gear $A^3$ and fixed against movement in relation to it are other gears $A^5$, $A^6$ $A^7$ about the counter shaft $A^4$.

Figure 4:
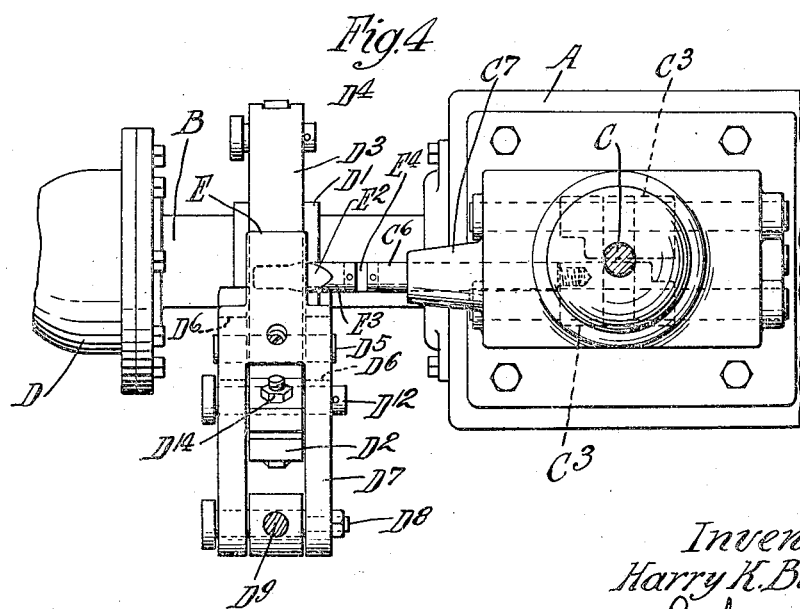
Figure 4 is a section on the line 4—4 of Figure 3.

B indicates a spline shaft splined to which are the sliding gear members $B^1$ $B^2$. The gear $B^1$ is provided with an internal gear or mesh $B^3$. $B^4$ indicates an idler gear adapted to be interposed between the gears $B^2$ and $A^7$, for the reverse. The parts herein shown are representative of the ordinary standard gear shift and do not of themselves form part of the present invention. It will be understood that any suitable means, for example the gear shift lever C with its ball $C^1$ and socket $C^2$ may be employed to shift gears by moving the gear members $B^1$ or $B^2$ respectively along the spline shaft B. This may be done for example through the members $C^3$ which control the collars or forks $C^4$ $C^5$ associated respectively with the gears $B^2$ and $B^1$. One of the members $C^3$ has screwthreaded to it the pin or shaft $C^6$ which extends outwardly through the housing A, as through the boss $C^7$. It will be understood that when the gear shift lever C is actuated to move one of the members $C^3$, and with it the collar $C^4$ and thus the gear $B^2$ into the reverse position, the pin or shaft $C^6$ is moved to the left, referring to the parts in the position in which they are shown in Figures 3 and 4.

The portion of the shaft B intermediate the housings A and D may have keyed to it a brake drum $D^1$ such as is shown in Figure 2 or Figures 6, 8 and 9. Surrounding this brake drum is the articulated brake shoe or pair of shoes generally indicated as $D^2$ $D^3$, the two members being pivoted together as at $D^4$. The shoe $D^3$, opposite said pivoted connection is provided with a pin $D^5$ which passes through the cam slots $D^6$ in the forked cam member $D^7$. This member is pivoted as at $D^8$ to a link $D^9$ which in turn is pivoted as at $D^{10}$ to any suitable portion $D^{11}$ of the automobile or engine frame. The shoe $D^2$ is pivoted as at $D^{12}$ to the member $D^7$. Means may be employed, for example the tension spring $D^{13}$, for drawing the ends of the shoes $D^2$ $D^3$ together. $D^{14}$ indicates any suitable tension means, for example a nut and bolt, for adjusting the tension on the spring $D^{13}$.

Associated with one end of the forked or apertured member or split member $D^7$ is the wedge element E shown in section for example in Figures 2, 6 and 8. Its wedge surface $E^1$ is arcuate in cross-setcion and is opposed to an arcuate wedge surface $E^2$, of larger radius, upon the opposed wedge member $E^3$ which is flexibly connected as at $E^4$ to the outer end of the member $C^6$. Whereas I have described an arcuate wedge surface it will be understood that a straight edged wedge might be employed.

Referring to Figure 8 I have illustrated within the shoe members $D^2$ $D^3$, the frictional gripping elements G, which may for example be of soft metal and which conform inwardly to the shape of the drum $D^1$. In Figures 2, 6 and 8 I have illustrated the drum $D^1$ as wedge-shaped in cross-section. In Figure 9 I illustrate it as composed of a plurality of angular wedges opposed to the frictional members $G^1$ conforming to them.

For the sake of clarity of the showing I have illustrated the retrograde brake mechanism as external. I indicate in dotted line in Figure 3 a housing H which can be independently supported or can be associated with for example the housing A. In practice I prefer to employ such a housing in order that the parts may be bathed in oil. In practice bathing the parts in oil does not hinder the efficient operation of the brake, the positive clutching or binding action being sufficient to overcome the lubricating tendency of the oil, whereas maintaining the parts washed in oil efficiently lubricates all the working engagement and pivot points.

It will be realized that whereas I have described and shown a practical and operative device, nevertheless many changes might be made in the size, shape, number and disposition of parts without departing from the spirt of my invention. I therefore wish my description and showing to be taken as in a broad sense illustrative and diagrammatic, rather than as limiting me to my specific showing. It will also be understood that whereas I have described my device as applied to an automobile vehicle with a gear shift, it may be applied to many other mechanisms in which it is desired to control or prevent a retrograde rotation of a shaft which normally rotates in a predetermined rotational direction. My invention may for example be applied to any rotary machine member, shaft or axle, such as material handling equipment, hoists, railway or street cars, wagons or the like in which reverse rotation for example if caused by loss of power or accident is undesirable. My device may be used either with or without the releasing attachment normally employed on automobiles for intended backward movement.

The use and operation of my invention are as follows:

In driving the ordinary car, as now manufactured and sold, for example upon an upward slope, if the car is left in neutral, it will roll gravitally rearwardly down the slope. Even when the gears are in mesh, if the engine is not turning over, the gravital pull on a steep slope may be sufficient to cause the car to roll rearwardly. When driving up slopes or hills, if the engine is killed, or if the operator wishes to stop the car and subsequently to start it, the gravital pull of the car makes it in many cases extremely difficult to start the car and again climb the hill because of the necessity of releasing the clutch to make the proper gear selection, and the necessity of simultaneously operating the brake, throttle, clutch and gear shift. This is a frequent cause of accident in hill or mountain driving and is a point of great inconvenience at locations where stop signals or cross-traffic routes are situated in hilly country, in such fashion that the driver must stop a car upon an up-grade and again start it. In heavy traffic, at such points, the tendency of the car to roll backward down a slope becomes a severe traffic hazard.

I provide means for preventing undesired retrograde movement of the car. These means include a brake applied directly to the driven shaft, intermediate the gear shift housing and the universal. Assuming that the shaft B is rotating in the proper direction for the forward movement of the car, which is counter clockwise as shown in Figures 1, 5 and 7, there is no tendency for the shoes $D^2$ and $D^3$ to bind about the drum $D^1$. The spring $D^{13}$ tends to draw them closely together but is of insufficient strength to move the parts into actual braking engagement, or to cause sufficient friction to heat the parts. Referring for example to Fig. 1 the parts are shown in unlocked position. The shoes $D^2$ $D^3$ are free from locking engagement with the drum $D^1$. This is the position in which the parts are when the car is moving forward at first, second or third speed or is standing still. Assume that the clutch is disengaged and is headed uphill on an incline, then retrograde, or clockwise movement of the shaft B and thus of the drum $D^1$ may begin. The frictional engagement of the shoes $D^2$ and $D^3$ with the drum is sufficient so that such clockwise movement of shaft and drum will cause the member $D^7$ to rotate about the pivot $D^8$ in the counter-clockwise direction illustrated by the arrow in Figure 1. The axis of the shaft B being fixed, this will cause the lateral movement of the pivot $D^8$ and the lower end of the link $D^9$ to the right, as shown by another arrow in Figure 1. At the same time the cam slots $D^6$ are moved downwardly and the effect is to cause the pin $D^5$ to approach the right end of the slot $D^6$. The result of these various movements is a very firm and immediate clamping of the shoes D² and D³ together and about and against the drum D¹. But a very slight movement is necessary in order to effect the clamping action. Such movement occurs almost instantaneously after the initiation of the rearward movement of the car, and before any substantial momentum develops. In practice the car moves slightly to the rear and then further retrograde movement is prevented by the locking engagement of the shoes and drum.

Although this locking action is automatic, immediate and efficient, no parts or locks have been set which impede a resumption of forward movement. All the operator has to do is to start his engine, and put it in gear with the shaft B, and start the car. Counter-clockwise movement of the shaft B and drum D¹ immediately rotates the brake shoes counter-clockwise to inoperative position, and they have no perceptible braking effect on the forward movement of the car.

I provide means for preventing the locking action above described from taking place when the operator wishes to back his car. The locking means are fully operative when the gear is in neutral or in some other of the forward speeds, preventing rearward movement of the car. But when the operator shifts to the reverse, he thereby moves the pin C⁶ to the left, as shown in Figures 3 and 4, or to the right as shown in Figures 2, 6 and 8 and thereby moves the wedge member E³ into engagement with the opposed wedge member E associated with the member D⁷. The result is to rotate the shoes into the position in which they are shown in Figure 5, in which they are held in inoperative position, and in which the pin D⁵ tends to approach the left end of the cam slot D⁶. This spreads the members D² D³ apart, increasing the tension on the spring D¹³. Figure 5 indicates the position of the parts as the wedge E³ is thrust into position and Figure 7 the position of the parts after the wedge is in position, and after the shoes are seated loosely on or about the brake drum D¹.

It will be realized that I do not wish to be limited, except so far as I limit myself in my claims to any particular type or shape of brake drum. Preferably the drum is convex and the shoes concave, and preferably I employ wedging surfaces. I may employ frictional liners or I may omit them, depending upon the particular conditions to be met.

To indicate one advantage of my device, assume that the car is stopped on a grade, with the clutch disengaged and the safety device in operation, preventing the car from rearward movement. If in this position the operator desires to permit or cause a rearward movement of the car, he may throw the gear shift into reverse, thereby releasing the device and permitting the car to move backward. He can stop this backward movement by moving the gear shift to neutral or any forward speed, which instantly puts the safety device into service.

I claim:

1. In a safety device for automotive vehicles which includes a motor shaft, a driven shaft, and speed change means interposed between said shafts, braking means applied to the driven shaft, including a brake drum, a shoe pivoted adjacent said brake drum and means for rotating it into locking engagement with the drum in response to retrograde rotation of the drum and means for preventing such locking engagement when the speed change means is in reverse, including a member actuated by said speed change means.

2. In a braking device for a shaft, adapted to prevent retrograde movement of said shaft, braking means including a plurality of segmental shoes, pivoted to each other, and surrounding said shaft, a connector member for said shoes in pivotal relation with one of them, and a cam connection between said connector member and the other of said shoes operable, in response to retrograde rotation of the shaft, to clamp said shoes together about said shaft.

3. In a safety device for automotive vehicles including a motor, a shaft and speed change means, braking means applied to a shaft, normally inoperative during rotation of said shaft in a predetermined direction, said braking means including a plurality of brake shoes pivoted to each other, a connector for said shoes, to which one of said shoes is pivoted, a cam connection between said connector and the other of said shoes, and supporting means to which said connector is pivoted.

4. In a safety device for automotive vehicles which includes a motor shaft, a driven shaft, and speed change means interposed between said shafts, braking means applied to the driven shaft, including a brake drum and a pair of shoe elements pivoted to each other and positioned about said drum, means for normally preventing locking engagement of the brake shoes and the drum, and means for moving them into locking engagement with the drum in response to retrograde rotation of the shaft, including a connecting member in pivotal relation with one of said shoes, and a cam connection between said member and the other of said shoes.

5. In a braking device for a shaft, adapted to prevent retrograde movement of said shaft, braking means including a plurality of segmental shoes, pivoted to each other, and surrounding said shaft, a connector member for said shoes in pivotal relation with one of them, and a cam connection between said connector member and the other of said shoes operable, in response to retrograde rotation of the shaft, to clamp said shoes together about said shaft, and a movable supporting connection for the connector member.

6. In a braking device for a shaft, adapted to prevent retrograde movement of said shaft, braking means including a plurality of segmental shoes, pivoted to each other, and surrounding said shaft, a connector member for said shoes in pivotal relation with one of them, and a cam connection between said connector member and the other of said shoes operable, in response to retrograde rotation of the shaft, to clamp said shoes together about said shaft, and a pivoted support to which the connector member is pivoted.

7. In a braking device for a shaft, adapted to prevent retrograde movement of said shaft, braking means including a plurality of segmental shoes, pivoted to each other, and surrounding said shaft, a connector member for said shoes in pivotal relation with one of them, and a cam connection between said connector member and the other of said shoes operable, in response to retrograde rotation of the shaft, to clamp said shoes together about said shaft, and a pivoted support to which the connector member is pivoted, the pivotal connection between said connector member and one of the shoes being positioned between the pivotal connection between connector member and support and the connector member and its cam connection with the other of said shoes.

8. In a braking device for a shaft, adapted to prevent retrograde movement of said shaft, braking means including a plurality of segmental shoes, pivoted to each other, and surrounding said shaft, a connector member for said shoes in pivotal relation with one of them, and a cam connection between said connector member and the other of said shoes operable, in response to retrograde rotation of the shaft, to clamp said shoes together about said shaft, and means for holding said braking device inoperative during desired retrograde rotation of the shaft.

9. In a braking device for a shaft, adapted to prevent retrograde movement of said shaft, braking means including a plurality of segmental shoes, pivoted to each other, and surrounding said shaft, a connector member for said shoes in pivotal relation with one of them, and a cam connection between said connector member and the other of said shoes operable, in response to retrograde rotation of the shaft, to clamp said shoes together about said shaft, and means for preventing said camming action during desired retrograde rotation of the shaft.

10. In a safety device for automotive vehicles including a motor, a shaft and speed change means, braking means applied to a shaft, normally inoperative during rotation of said shaft in a predetermined direction, said braking means including a plurality of brake shoes pivoted to each other, a connector for said shoes, to which one of said shoes is pivoted, a cam connection between said connector and the other of said shoes, and supporting means to which said connector is pivoted, said cam connection being adapted, in response to retrograde rotation of the shaft, to move said shoes into gripping engagement into securing position about the shaft.

11. In a safety device for automotive vehicles including a motor, a shaft and speed change means, braking means applied to a shaft, normally inoperative during rotation of said shaft in a predetermined direction, said braking means including a plurality of brake shoes pivoted to each other, a connector for said shoes, to which one of said shoes is pivoted, a cam connection between said connector and the other of said shoes, and supporting means to which said connector is pivoted, the shoes being themselves rotatable, through a limited arc, about the axis of rotation of the shaft.

12. In a safety device for automotive vehicles including a motor, a shaft and speed change means, braking means applied to a shaft, normally inoperative during rotation of said shaft in a predetermined direction, said braking means including a plurality of brake shoes pivoted to each other, a connector for said shoes, to which one of said shoes is pivoted, a cam connection between said connector and the other of said shoes, and supporting means to which said connector is pivoted, and means for maintaining a non-gripping contact of the shoes about the shaft.

13. In a safety device for automotive vehicles including a motor, a shaft and speed change means, braking means applied to a shaft, normally inoperative during rotation of said shaft in a predetermined direction, said braking means including a plurality of brake shoes pivoted to each other, a connector for said shoes, to which one of said shoes is pivoted, a cam connection between said connector and the other of said shoes, and supporting means to which said connector is pivoted, and means adapted, when the speed change means is in reverse, adapted to prevent gripping contact of the shoes about the shaft.

Signed at Chicago, county of Cook and State of Illinois, this 7th day of October 1929.

HARRY K. BLANNING.